May 25, 1943.      L. D. DANFORTH      2,320,031
LOCK NUTS INCLUDING METHODS FOR THEIR CONSTRUCTION
Filed Feb. 28, 1941

INVENTOR.
Louis D. Danforth
BY

Patented May 25, 1943

2,320,031

UNITED STATES PATENT OFFICE 2,320,031

LOCK NUT, INCLUDING A METHOD FOR ITS CONSTRUCTION

Louis D. Danforth, Los Angeles, Calif., assignor of one-twelfth to Samuel Reginald Smith, two-twelfths to G. C. Lambert, three-twelfths to W. Reid Ferguson, and four-twelfths to Henry A. Irwin, all of Los Angeles, Calif.

Application February 28, 1941, Serial No. 381,012

4 Claims. (Cl. 10—86)

The present invention relates to improvements in lock nut and is directed not only to the physical attributes of the nut but also to the method by which it is made.

As further perusal of this specification will show the present invention contemplates the incorporation of a non-metallic insert in such manner as to create a predetermined degree of thread lead off-set between the threads of the nut proper and the non-metallic insert associated therewith.

Constant effort has been made to provide a nut having a higher degree of efficiency than ordinarily exists between a standard nut and its companion bolt as is readily attested to by the many patents that have already issued upon this subject, but notwithstanding the prior art as known to your petitioner, together with a practical knowledge of the requirements to be met in the field, it is my belief that the features of invention herein present have never been employed to effect a more positive relationship between a nut and bolt than can otherwise be had.

The objects of the invention may be stated as being:

(1) To provide a nut with a non-metallic insert in which a predetermined degree of off-set thread lead exists as between the two elements.

(2) To provide a simple and facile means or method by which the above purpose may be accomplished.

(3) To provide an efficient yet relatively speaking a low cost lock nut.

Other objects, features, and advantages of the invention may appear from the accompanying drawing, specification, and appended claims.

Figure 1:
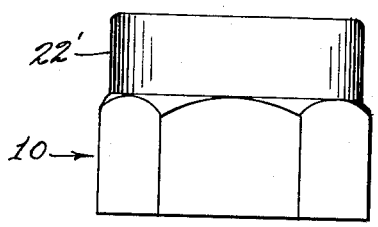
Figure 1 is a side-elevational view showing the completed product of this invention.
Figure 2:
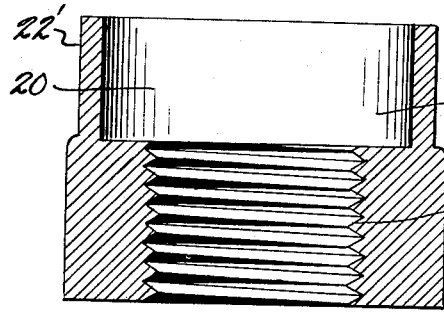
Figure 2 is a mid-sectional view showing the metallic portion of the nut prior to placement of the non-metallic insert.

In the drawing the reference character 10 indicates the lock nut of this invention which as shown therein comprises a metallic body portion 12 and a non-metallic insert 14.

In making the nut of this invention I first select the metal stock from which I propose to form the article, the length of the stock being such as to permit the formation of a threaded portion of conventional depth and in addition thereto the formation of an annular recess of sufficient depth to accommodate the non-metallic insert 14 together with an end marginal portion to be turned over upon the insert to lock the same within the nut upon completion.

One procedure I follow after determining the length of the stock and cutting the same from the commercial length in which it comes, is to place such length of stock in a suitable machine, such as a lathe or automatic screw machine and then bore the body portion 12 along its axial length which operation is then carried a step further by running threads 16 in the bore thus created. A counterbore 18 is then run into the body of the nut and in axial alignment with the first stated bore but is of course shown in the drawing, of greater diameter than the first bore so that an off-set or seat 20 is created at their place of intersection.

That portion of the body 10 which lies exterior of the bore 18 is turned down until the outer wall 22' is concentric with the bore 18 and is of such reduced wall section as to lend itself to being rolled over in a subsequent operation to hold the insert 14 fixedly in position.

Figure 3:
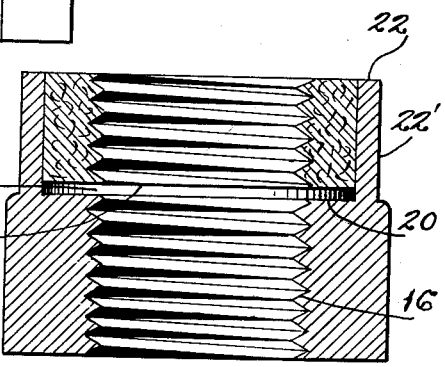
Figure 3 is a mid-sectional view showing the fiber or non-metallic insert placed within the nut but in spaced relation thereto so that complementary thread ends are not in continuity.
Figure 4:
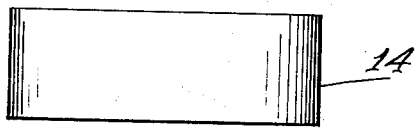
Figure 4 is a side-elevational view of the insert.
Figure 5:
Figure 5 is a mid-sectional view of the insert.
Figure 6:
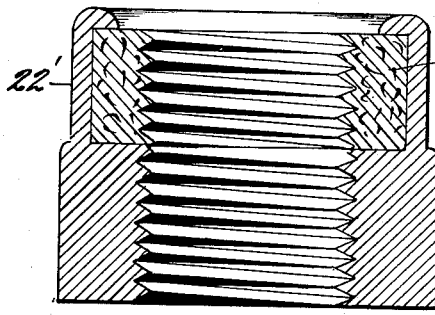
Figure 6 is a transverse sectional view showing the insert pressed into contiguous relationship with the metallic portion of the nut, and also showing a preferred method of securing the insert in fixed position.

I then place an unthreaded non-metallic insert or washer 14 in the bore 18 and force the insert into the bore until the top edge of the insert coincides with the top edge 22 of the recess 18, see Figure 3, and when thus placed a limited spacing 24 occurs between the insert and the seat 20 in the body portion of the nut.

The insert 14 is of such size in relation to the bore 18 that the insert must be pressed thereinto and held firm, for is must not rotate. After being thus positioned a tap is run through the threads already formed and is used to cut threads in the insert 14 so that thread continuity is had between the insert and the body of the nut except for the limited spacing 24 between the two elements.

After the threads are run and the tap has been removed the insert is then pressed again until its bottom edge 26 rests in firm face contact with the seat 20. This step being had in order to break the thread end continuity and to create an off-set relationship between the adjacent ends of the threads in the insert 14 and body 12. Thereafter the top marginal portion 22 is rolled over to imprison the insert in position firmly upon the seat 20.

Figure 7:
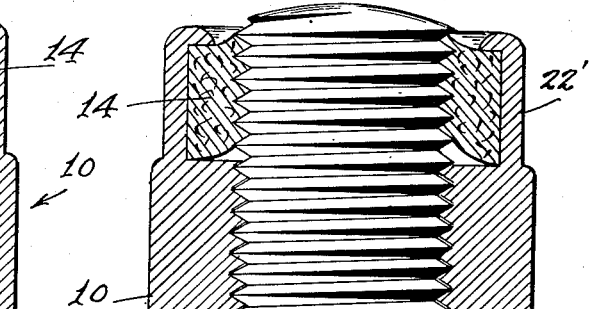
Figure 7 is a view partially in section showing in somewhat exaggerated manner the action of the off-set lead insert in placing pressure upon the threads of the bolt.

While the preceding description is illustrative of one approach to construction of a nut possessing an off-set thread lead, it will be apparent that the aforementioned operations can be varied. For instance, the bores in the body of the nut could be formed as a continuous operation, that is, the smaller bore could be used as a pilot bore for the greater. Also, the threads in the metallic portion of the nut could be run first and then as a continuing operation the threads could be run in the insert, provided only that the spaced relationship 24 is maintained at the time of thread running. Nuts made in this manner are possessed of a constant and unvarying off-set thread lead which is a matter of great importance and results in practice in creating a very firm and positive relationship between the threads of the nut and bolt, the action of which is illustrated in Figure 7.

The preceding matter is merely illustrative of the preferred construction and method of procedure involved in making the same, however the true measure and scope of the invention is defined by a reasonable interpretation of the claims.

I claim:

1. The method of making a lock nut comprising temporarily securing a tubular metal body and tubular yieldable member against relative movement, simultaneously forming threads on the interiors of the body and member, shifting the member axially with respect to the body to move the threads out of phase relation, and then fixedly securing the member against axial displacement relative to the body to maintain said threads in out of phase relation.

2. The method of making a lock nut comprising securing a tubular metallic nut body and a tubular member of yieldable material against relative movement, forming internal threads in the body and member while so held against relative movement, then bodily shifting the member axially with respect to body and then fixedly securing the member against bodily displacement so that the threads are out of phase relation.

3. The method of constructing a lock nut which comprises the steps of creating bores of differential transverse section in a predetermined length of stock whereby a seat is created at the place of intersection of said bores, the placing of an unthreaded somewhat yielding annulus in the greater of said bores in spaced relation to said seat, the threading of the lesser of said bores and of said annulus, the moving of the threaded annulus into firm contact with said seat, and then fixedly securing the threaded annulus in position against said seat so that the threads of said lesser bore and annulus are maintained in out of phase relation.

4. The method of constructing a lock nut which comprises the steps of creating aligned bores of differential transverse section in a predetermined length of stock whereby a seat is created at the place of intersection of said bores, the placing of an unthreaded fibrous annulus of lesser depth than the depth of the greater bore in said last mentiontd bore so that the annulus is in axial clearance of the said seat, the threading of the lesser of said bores and said annulus as a continuing operation, the bodily moving of the just threaded annulus axially into firm contact with said seat whereby the thread end of the annulus is brought into an offset relationship with the one thread end of the lesser of said bores, and then fixedly securing the annulus in said position against the said seat to maintain the threads in said offset relation.

LOUIS D. DANFORTH.